(12) United States Patent
Town et al.

(10) Patent No.: US 8,722,168 B2
(45) Date of Patent: *May 13, 2014

(54) DATA DISC, METHOD AND SYSTEM OF FORMING THE DISC

(75) Inventors: John Matthew Town, Ojal, CA (US); Patrick J. Byrne, Ojal, CA (US); Thomas Hartmann, Wiesen (DE); Alan Bruce Hamersley, Newbury Park, CA (US)

(73) Assignee: Thomson Licensing, Issy-les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/379,791

(22) PCT Filed: Jun. 22, 2010

(86) PCT No.: PCT/US2010/001781
§ 371 (c)(1),
(2), (4) Date: Dec. 21, 2011

(87) PCT Pub. No.: WO2010/151309
PCT Pub. Date: Dec. 29, 2010

(65) Prior Publication Data
US 2012/0141718 A1 Jun. 7, 2012

Related U.S. Application Data

(60) Provisional application No. 61/269,342, filed on Jun. 23, 2009, provisional application No. 61/291,825, filed on Dec. 31, 2009, provisional application No. 61/295,689, filed on Jan. 16, 2010.

(30) Foreign Application Priority Data

Dec. 3, 2009 (WO) .............. PCT/US2009/006370

(51) Int. Cl.
*G11B 7/24* (2013.01)

(52) U.S. Cl.
USPC .............. 428/64.1; 428/64.4; 430/270.11

(58) Field of Classification Search
USPC ................... 428/64.4; 430/270.11
See application file for complete search history.

(56) References Cited

U.S. PATENT DOCUMENTS 5,568,466 A  10/1996 Komaki et al.
5,827,593 A  10/1998 Maruyama et al.
(Continued)

FOREIGN PATENT DOCUMENTS

CN  1324074 A  11/2001
EP  1752980     2/2007
(Continued)

OTHER PUBLICATIONS

Singulus "Bluline II BD50", Enabling the Blu-Ray Future, eight pages.

(Continued)

*Primary Examiner* — Elizabeth Mulvaney
(74) *Attorney, Agent, or Firm* — Robert D. Shedd; Wan Yee Cheung

(57) ABSTRACT

A data disc, method and apparatus for forming the disc are disclosed. The data disc includes a first substrate structure bonded to a second substrate structure, with two curable material layers disposed on different sides of at least one of the two substrate structures, and at least one groove formed on a surface of one of the two curable material layers.

22 Claims, 13 Drawing Sheets

(56) References Cited

U.S. PATENT DOCUMENTS

| | | |
|---|---|---|
| 6,657,948 B1 | 12/2003 | Tajima et al. |
| 7,007,290 B2 | 2/2006 | Wilcoxson et al. |
| 7,214,052 B2 | 5/2007 | Gabriel |
| 7,383,560 B2 | 6/2008 | Edwards |
| 7,684,309 B2 | 3/2010 | Mueller |
| 2001/0053122 A1 | 12/2001 | Yukumoto et al. |
| 2002/0025402 A1 | 2/2002 | Tronche et al. |
| 2002/0141329 A1 | 10/2002 | Tajima et al. |
| 2003/0145941 A1 | 8/2003 | Hanzawa |
| 2004/0002018 A1 | 1/2004 | Oishi et al. |
| 2004/0013976 A1 | 1/2004 | Fujimoto et al. |
| 2004/0081070 A1 | 4/2004 | Correa |
| 2004/0170119 A1 | 9/2004 | Watanabe |
| 2004/0205807 A1 | 10/2004 | Wilcoxson et al. |
| 2005/0205205 A1 | 9/2005 | Kratzer et al. |
| 2006/0136947 A1 | 6/2006 | LeBlanc et al. |
| 2006/0166140 A1 | 7/2006 | Fujimoto et al. |
| 2006/0167200 A1 | 7/2006 | Fujimoto et al. |
| 2006/0184958 A1 | 8/2006 | Garcia |
| 2006/0280110 A1 | 12/2006 | Katoh et al. |
| 2007/0059479 A1 | 3/2007 | Oguni |
| 2007/0076576 A1 | 4/2007 | Schreiber |
| 2007/0105048 A1 | 5/2007 | Hiroki |
| 2008/0107010 A1 | 5/2008 | Town |
| 2008/0219111 A1 | 9/2008 | Rompacy et al. |
| 2008/0318170 A1 | 12/2008 | Lin et al. |
| 2009/0144763 A1 | 6/2009 | Hurst et al. |
| 2009/0148651 A1 | 6/2009 | Tokuda et al. |
| 2009/0207723 A1 | 8/2009 | Ito |

FOREIGN PATENT DOCUMENTS

| | | |
|---|---|---|
| JP | 07201083 | 8/1995 |
| JP | 11120617 A | 4/1999 |
| JP | 2002251784 | 9/2002 |
| JP | 2003263803 A | 9/2003 |
| WO | WO9838637 | 9/1998 |
| WO | WO9962060 | 12/1999 |
| WO | WO2006036016 | 4/2006 |
| WO | WO2006071809 | 7/2006 |

OTHER PUBLICATIONS

Singulus Singulus Molding, Smart Solutions to Drive the Future, 6 pages.

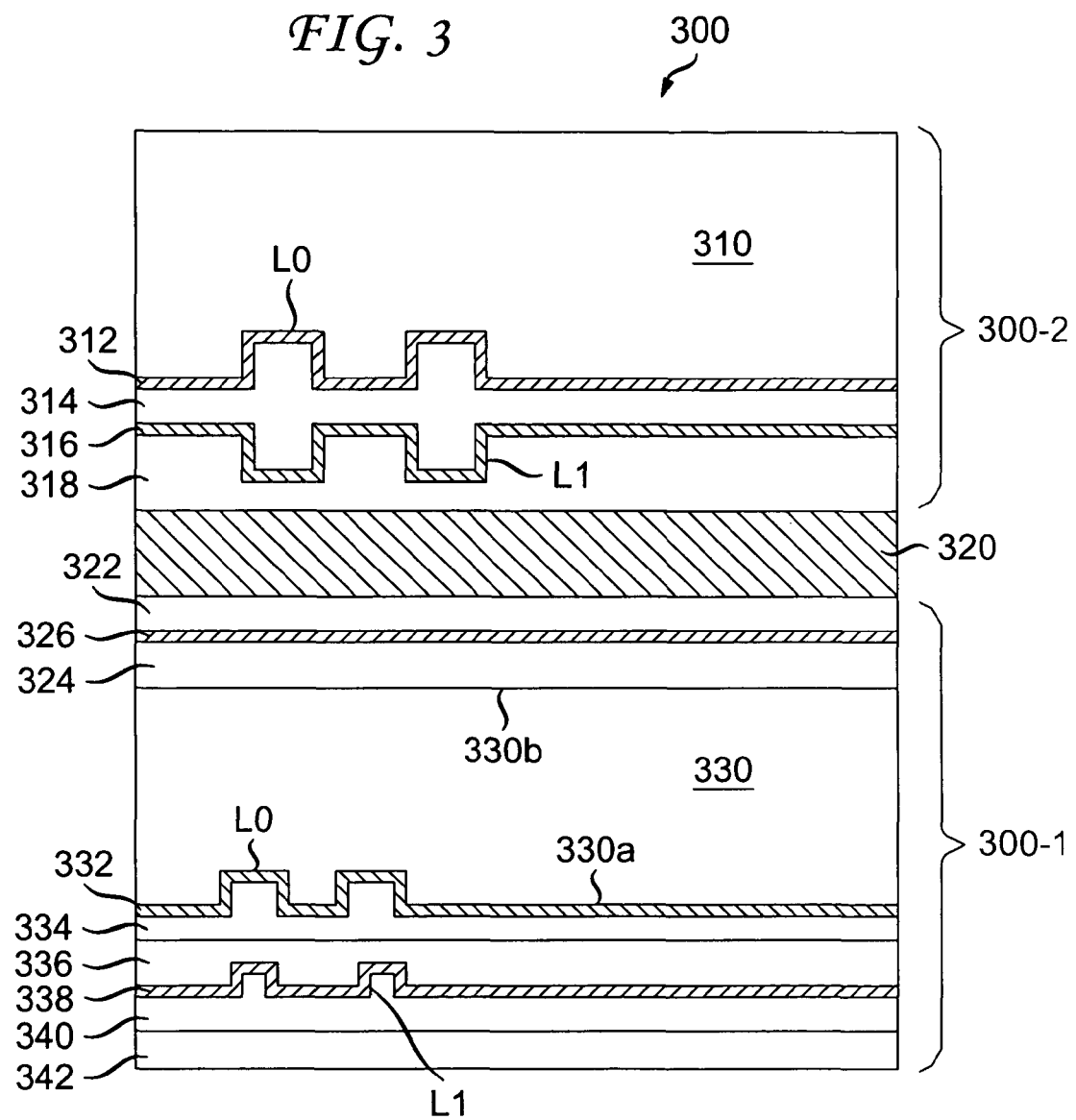

US 8,722,168 B2

DATA DISC, METHOD AND SYSTEM OF FORMING THE DISC

CROSS-REFERENCE TO RELATED APPLICATIONS

This application claims the benefit, under 35 U.S.C. §365 of International Application PCT/US2010/001781 filed Jun. 22, 2010 which was published in accordance with PCT Article 21(2) on Dec. 29, 2010 in English and which claims the benefit of U.S. Provisional Patent Application No. 61/269,342 filed on Jun. 23, 2009, U.S. Provisional Patent Application No. 61/291,825 filed Dec. 31, 2009, U.S. Provisional Patent Application No. 61/295,689 filed on Jan. 16, 2010, and PCT Application No. PCT/US2009/006370, filed Dec. 3, 2009.

TECHNICAL FIELD

The present invention relates to a data disc having two curable material layers on different sides of a substrate structure, and at least one groove on a surface of one of the curable material layers.

BACKGROUND

With the development and availability of different data formats for multimedia content, it is often desirable to have contents in different data formats on a single data disc. To manufacture these hybrid discs, it is necessary to modify conventional fabrication processes and/or systems typically used for single format discs.

To facilitate understanding of the embodiments of the present principles, some background relating to a conventional optical disc and its manufacturing process is provided in FIG. 1 and FIG. 2a-d, respectively.

FIG. 1 is a schematic illustration of a conventional dual layer optical disc. The optical disc 100 has a substrate 102, a first reflective layer 104, a spacer or bonding layer 106, a second reflective layer 108, and a layer 110. For a Blu-ray disc (BD), layer 110 is a cover layer, and for a digital versatile disc (DVD), layer 110 is a second substrate. For a BD, the substrate 102 is typically a 1.1 mm polycarbonate disc, and the first reflective layer 104, which is highly or substantially totally reflective at the read-out wavelength, can be made of a silver alloy or aluminum with a thickness of less than about 50 nm. The second reflective layer 108, which is partially reflective, can be made of a silver alloy with a thickness of less than about 20 nm. The Blu-ray spacer layer 106 is made of a transparent resin material and has a thickness of about 25 µm, and the cover layer is made of a transparent material with a thickness of about 75 µm, and may also include a protective hard coating.

Presently, there are two widely used methods for manufacturing dual-layer Blu-ray optical discs. One is a plastic stamper method, and the other is a "wet embossing" method. The plastic stamper method is also referred to as a "2P" process, which stands for photo polymerization (referring to one of the steps in the method). The method involves molding a first data layer in a first substrate, and a second data layer in a second substrate. After a reflective layer is formed over the first data layer, the two substrates are bonded to each other using an adhesive. The second substrate is then separated and discarded, leaving an impression of the second data layer molded into the adhesive layer remaining on the first substrate. Additional processing steps are performed to complete the fabrication of the disc. In the case of Blu-ray discs, the first substrate is a 1.1 mm disc, and the second substrate may be a 0.6 mm disc.

The 2P method is further illustrated with reference to FIGS. 2a-d, which depict cross-sectional views showing various stages during the fabrication of an optical disc, e.g., a Blu-ray disc. FIG. 2a shows a first substrate 202, e.g., a 1.1 mm thick polycarbonate disc, with a surface 202D having structures such as pits and lands representing data in a first data layer. A first reflective layer 204 is formed over the molded surface 202D of the substrate 202. A different substrate 250, e.g., a polycarbonate disc, typically with a thickness of 0.6 mm, has a surface 250D with pits and lands representing data in a second data layer. Surfaces 202D and 250D are molded using respective stampers (not shown).

The substrate 250 is bonded to the reflective layer 204 with an adhesive layer 206 (which may be made of two separate layers of different adhesive materials), as shown in FIG. 2b. After curing the adhesive by exposure to ultra-violet (UV) light (through photo polymerization of the adhesive), the substrate 250 is mechanically stripped from the reflective layer 204, leaving the data layer impression on a surface 206D of the adhesive layer 206, as shown in FIG. 2c. Since the substrate 250 is discarded after this fabrication, and effectively serves as a stamper for transferring the data layer onto the adhesive 206, it is also referred to as a sacrificial plastic stamper.

The substrate structure in FIG. 2c has two data layers—one molded on the substrate 202 and the other on adhesive layer 206. A reflective layer 208 is then formed over the data surface 206D of the adhesive layer 206, e.g., by sputtering, and a cover layer 210 is applied over the reflective layer 208, resulting in an optical disc 200, as shown in FIG. 2d.

Another conventional method for making discs is the "wet embossing" method, which starts by molding the first data layer in the 1.1 mm Blu-ray disc polycarbonate substrate 202 as shown in FIG. 2a. After applying the first reflective layer 204, one or two layers of lacquer (not shown), including a wet embossing lacquer, are applied over the reflective layer 204. The second data layer is embossed in the wet lacquer using a re-usable nickel stamper and the lacquer is UV-cured on the stamper. The disc structure is subsequently removed from the stamper, and fabrication is completed by performing additional steps such as those described above in connection with FIG. 2c-d.

Typically in disc manufacture, individual substrates are stacked on spindles of about 100 to 150 discs for transport between sequential manufacturing processes (e.g. replication, printing, and packaging). To facilitate the ease of un-stacking, molded spacers or "stacking rings" are provided on the underside of substrates. In the case of certain intermediate replication processes, the molded stacking rings fail to provide sufficient clearance to allow un-stacking or disc separation by typical automated handling methods. The flat or smooth adjacent disc surfaces on spindles of 100-150 discs used to transport substrates cause the substrates to stick together such that downstream automation processes are negatively impacted.

SUMMARY OF THE INVENTION

The above problem can be overcome by a method that involves forming at least one groove on an otherwise flat surface of a substrate structure during disc manufacture. Embodiment of the present principles include a method of fabricating a data disc, an apparatus for use in forming the disc, a computer readable medium with stored program instructions for performing the method, and a data disc formed by the method. As an example, the method is used for forming a data disc with two substrate structures (or "half-discs") bonded together, in which the two substrate structures have respective data formats that are different from each other.

Thus, in one embodiment, a method is provided for forming a data disc having a first substrate structure and a second substrate structure, the first substrate structure having a data layer with a format different from a format of a data layer in the second substrate structure. The method includes: forming a first curable material layer on a first side of the first substrate structure, forming a second curable material layer on a second side of the first substrate structure, forming at least one groove on the second curable material layer, and bonding the first substrate structure to the second substrate structure.

Another embodiment provides a data disc that includes a first substrate structure bonded to a second substrate structure, the first substrate structure having a data layer with a format different from a format of a data layer in the second substrate structure. The first substrate structure further includes a first curable material layer and a second curable material layer on different sides of the first substrate structure, in which the second curable material layer has at least one groove formed thereon.

BRIEF DESCRIPTION OF THE DRAWINGS

The teachings of the present invention can be readily understood by considering the following detailed description in conjunction with the accompanying drawings, in which:

FIG. 3 illustrates a layer structure of a hybrid disc in accordance with one embodiment of the present principles;

To facilitate understanding, identical reference numerals have been used, where possible, to designate identical elements that are common to the figures. The drawings are not to scale, and one or more features may be expanded or reduced for clarity.

DETAILED DESCRIPTION

Figure 1:
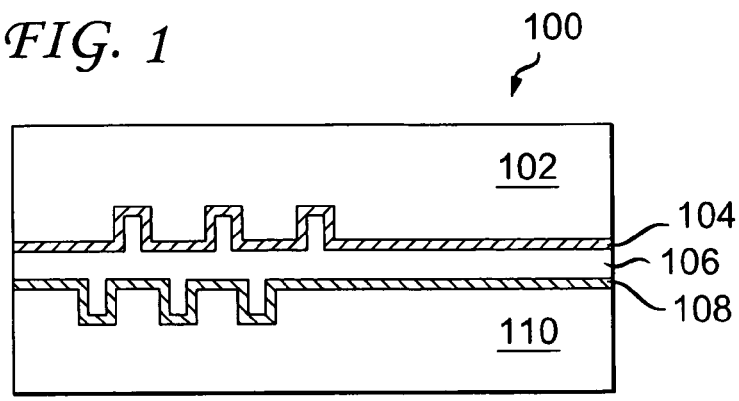
FIG. 1 illustrates a structure of a conventional dual-layer disc.
Figure 2A:
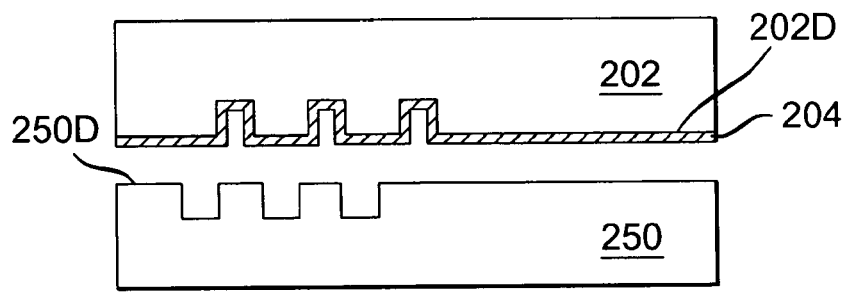
FIGS. 2a-d are cross-sectional views illustrating a process suitable for forming the dual-layer disc of FIG. 1.
Figure 2B:
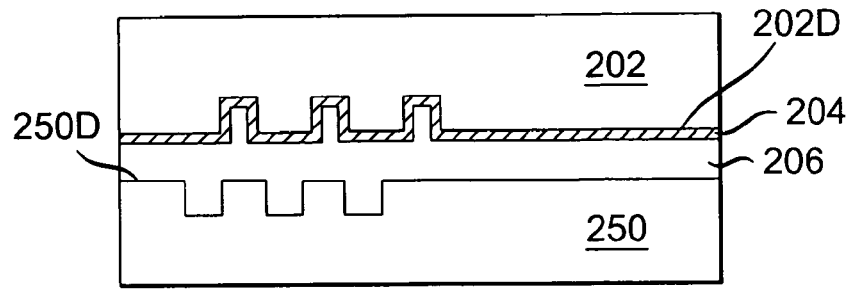
Figure 2C:
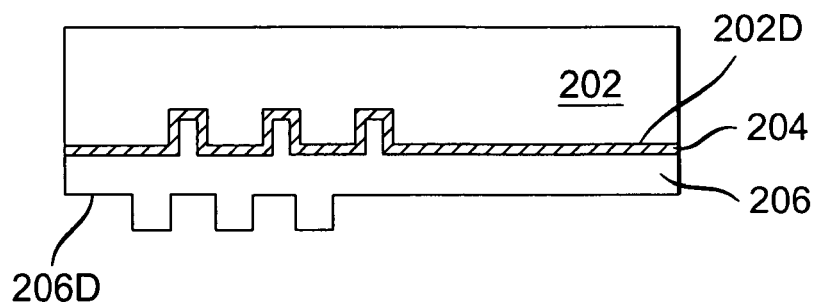
Figure 2D:
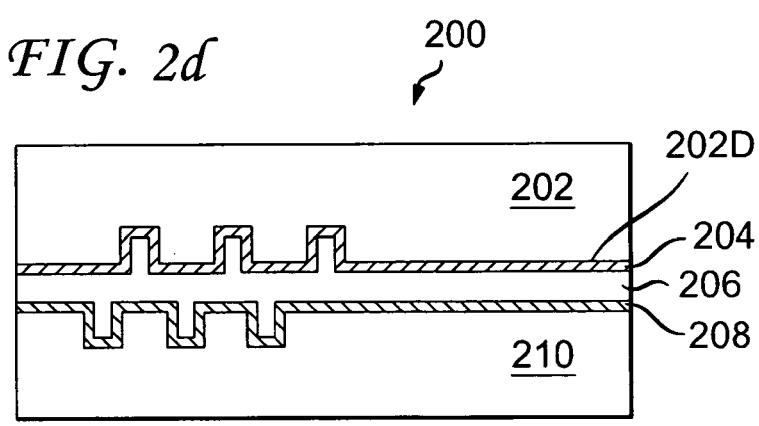

The method of the present principles overcomes a problem of disc substrates sticking together during disc handling, stacking or transport due to the close contact of essentially flat smooth surfaces, which can often be made of similar materials. During disc manufacturing, at least one groove or a groove structure (which may include concentric grooves, a continuous spiral groove, or other groove patterns, among others) is formed on a surface of a substrate structure by using air jets directed on the surface of a resin layer prior to curing. In one example, at least one groove is formed on a surface of a curable material layer of a substrate structure, and used in combination with other features described below to form a data disc having at least two different data formats (also referred to as a "hybrid" disc). The groove structure is formed on a surface such that it will not interfere with data readout or writing, e.g., the grooved surface is preferably not in an optical path of a data read or write beam.

As will be shown below, a hybrid disc of the present principles includes a first substrate structure bonded to a second substrate structure, with the first and second substrate structures having data in different formats, and respective first and second substrates having different combinations of material layers, stacking ring configuration, and at least one groove formed in one or more curable material layers.

In one embodiment, one of the substrate structures has a substrate with a first curable material layer on one side of its substrate, and a second curable material layer on the other side of the substrate. Each of the curable materials has a property that results in shrinkage of the respective layer associated with curing of the material. The use of these curable layers on different sides of the substrate allows the curvature of the substrate structure to be controlled.

In another embodiment, one or more grooves with various patterns are formed on at least one curable material layer.

One embodiment of the hybrid disc is a double-sided double layer (DS-DL) disc, with two data layers in DVD format being accessible or read from one side of the disc, and two data layers in Blu-ray disc (BD) format being accessible or read from the other side of the disc. As discussed below, conventional equipment (i.e., designed for making standard DVDs) can be adapted for making a DVD substrate structure without a stacking ring (which is a configuration different from that of a standard DVD), which can then be bonded to a BD substrate structure to form a hybrid disc with a reduced total height that conforms to the specifications of the DVD and BD standards.

One or more features of the present principles may be applied to other combinations of disc formats and/or number of data layers. Thus, the disc formats may include at least two formats, e.g., BD25/DVD9, BD25/DVD5, BD50/DVD5, BD50/BD50, BD25/BD25, among others, as well as those available in the future or being developed, e.g., BD200. In addition, one or more sides of the final disc may itself have mixed or hybrid formats on the same side of the disc, including BD, DVD or other applicable formats. In general, each side of the disc may have multiple data layers, and the number of data layers for one side of the disc may be the same as, or different from, the number of data layers for the other side of the disc.

Furthermore, any of the data layers may be a recordable layer (as opposed to all pre-recorded layers in the examples discussed below), and each side may have any combination of pre-recorded and recordable layers, and in one or more data formats.

FIG. 3 is a schematic cross-section showing various material layers of one example of the hybrid optical disc 300. The disc can be formed by bonding together two substrate structures 300-1 and 300-2, each having been separately formed to include respective material and data layers. Table 1 lists the information, e.g., materials, nominal thickness and range, and method of forming the layers, relating to the various layers of FIG. 3. It is understood that, depending on the specific applications or disc formats, other alternatives, e.g., different materials, apply methods and/or layer thicknesses, may also be used. Details regarding the individual layers will be further discussed below.

Process steps for forming the hybrid disc can be performed using equipment similar to those designed for making standard DVDs and BDs. Equipment and/or processes of existing manufacturing lines (e.g., SPACELINE II and BLULINE II from Singulus Technologies AG of Germany, among others) can be modified to provide configurations suitable for forming the hybrid discs of the present principles, e.g., hardware components for accommodating the different dimensions of the substrates, as well as process conditions to provide substrate structures according to various physical specifications (that may or may not be the same as in conventional DVD or BD processes or established known standards).

Blu-ray Disc Substrate Structure

The BD substrate structure 300-1 includes a substrate 330, with the following layers formed on one side 300a of the

TABLE 1

| Layer Material | Apply Method | Description | Nominal Thickness; Range (μm) | Process | Layer # |
|---|---|---|---|---|---|
| Polycarbonate | Injection Mold | Molded disc with pit structure for Layer-0 | 570; 550-640 | D1 | 310 |
| Silver alloy | Sputter | Semi-reflective layer | 0.01; 0.005-0.025 | D2 | 312 |
| UV Acrylic Resin | Spin-coat | Spacer Layer (Layer-1 data pits imprinted) | 55; 40-70 | D3 | 314 |
| Aluminum | Sputter | Full-reflective layer | 0.04; 0.02-0.06 | D2 | 316 |
| UV Acrylic Resin | Spin-coat | Protective Layer | 10; 5-15 | H1 | 318 |
| Cationic Adhesive (DVD18) | Screen print | Cationic adhesive | 40; 20-60 | H2 | 320 |
| UV Acrylic Resin | Spin-coat | Tilt-offset Layer | 10; 5-40 | H3 | 322 |
| Metal or dielectric | Sputter | Intermediate Layer | 0.01; 0.005-0.050 | B9 | 326 |
| UV Acrylic Resin | Spin-coat | Tilt-offset Layer | 50; 2-75 | B8 | 324 |
| Polycarbonate | Injection Mold | Molded disc with pit structure for Layer-0 | 500; 450-550 | B1 | 330 |
| Silver alloy | Sputter | Full-reflective layer | 0.04; 0.02-0.06 | B2 | 332 |
| UV Acrylic Resin (a) | Spin-coat | Spacer (base)-layer | 22; 18-28 | B3 | 334 |
| UV Acrylic Resin (b) | Spin-coat | Pit-layer (Layer-1 data pits imprinted) | 3; 2-12 | B4 | 336 |
| Silver alloy | Sputter | Semi-reflective layer | 0.01; 0.005-0.025 | B5 | 338 |
| UV Acrylic Resin (c) | Spin-coat | Cover layer | 72; 65-72 | B6 | 340 |
| UV Acrylic Resin (d) | Spin-coat | Hardcoat/anti-scratch | 3; 3-10 | B7 | 342 |
| | | Total thickness | 1335.1 | | |

In the process column of Table 1, prefix "B" refers to a process performed on a BD fabrication line, and prefix "D" refers to a process on a DVD fabrication line, and H refers to a process on a stripper-bonder (STB), e.g., a STB for DVD-18. The layer column lists reference numerals for the various layers in FIG. 3.

In this example, one substrate structure 300-2 is similar to a DVD-18 "half-disc", e.g., DVD-9, having two data layers (L0 and L1) accessible from one side (in this case, the top side) of the hybrid disc. The other substrate structure 300-1 is similar to a BD-50 "half-disc", with two data layers (L0 and L1) accessible from the other side (bottom side) of the hybrid disc. The terminologies used herein refer to those in the DVD specifications for read-only memory (ROM) published by the DVD Forum, and the Blu-ray disc read-only format published by the Blu-ray Disc Association.

substrate, from top to bottom in FIG. 3: a reflective layer 332, a spacer layer 334, a pit layer 336 (or data layer), a semi-reflective layer 338, a cover layer 340 and a hardcoat layer 342. In addition, one or more resin layers 322, 324 and intermediate layer 326 may also be formed on the other side 300b of the substrate 330. Except for the reflective layer 332, the semi-reflective layer 338, and layer 326, the other layers in the BD structure are all transparent layers made from non-metallic materials, e.g., polycarbonate, curable polymers such as UV-curing acrylic resin, among others. Depending on the material used, the intermediate layer 326 may have different reflectivity or transmission characteristics. As used herein, a substrate (e.g., substrate 330) and one or more material or data layers associated with that substrate may collectively be referred to as a substrate structure. For example, layers associated with substrate 330 or substrate structure 300-1 include those formed on or contacting the substrate 330

(e.g., layers 324 and 332), as well as others that do not contact the substrate 330 (e.g., layers 334, 322, and so on), but are nonetheless formed "over" the substrate as part of the substrate structure.

Unlike conventional BDs (with a substrate thickness of 1.1 mm), the substrate 330 for this hybrid disc has a thickness of about 500 µm (0.5 mm), or close to the thickness of a DVD. Other embodiments may have a BD substrate thickness of less than about 0.55 mm; or in a range between 0.25 mm to 0.55 mm. In another embodiment, the BD substrate has a thickness between about 0.45 mm to about 0.55 mm. Molded pits, representing a first data layer L0, are formed in the substrate 330 using injection molding and stamping.

Injection molding process B1 can be performed in a molding machine that has been modified (e.g., from a machine used for producing conventional BDs) to produce a substrate that is thinner than 1.1 mm, i.e., thinner than a conventional BD substrate. In one example, the modification may be done by mechanically adjusting the mold components to provide an effective dimension for forming a thinner substrate. This allows a conventional machine designed for standard BD substrates to be configured or retrofitted for this operation in a much shorter timeframe, e.g., resulting in over a 6-fold reduction in the time required, when compared to replacing the entire mold itself.

One or more of the molding process conditions, e.g., temperatures, process time, cooling rate, spin speed, mold pressure, and so on, may be adjusted accordingly to form the thinner BD substrate within desired specifications.

The remaining layers 332, 334, 336, 338, 340 and 342 can be formed in sequence over the substrate 330, e.g., formed over the surface 330a (although these layers are shown in FIG. 3 to be "below" the surface 330a) using known or conventional processes and materials such as those used for forming standard BD-50. Examples of some known processes or production steps for forming standard BDs include those used in the Singulus BLULINE II production system, for example, described in the Singulus brochure, "BLULINE II BD50 Enabling the Blu-ray Future," of 2008, and others discussed in "Smart Solutions to Drive the Future" by Eggo Sichmann, Singulus, May 2005. Both documents are available from the interne, or from Singulus Technologies AG, of Germany. Materials in these documents are herein incorporated by reference in their entirety. In one embodiment, various layers of the BD substrate structure can be formed in different machines and units integrated in a BD production system, e.g., a molding machine, spin-coater, sputtering machine, and so on.

As illustrated in FIG. 3 and Table 1, after a reflective layer 332, two transparent layers 334 and 336 are formed. In this example, these layers are made of different thickness of different types of curable materials, including, for example, radiation or thermal curable polymers or resins, e.g., UV-curable acrylic resins or acrylates. The materials and layer thicknesses are selected to provide suitable or optimal properties (e.g., optical, mechanical, chemical, among others) for respective functions. Layer 334, which is in direct contact with reflective layer 332, should have properties that are compatible with the material (e.g., silver) in reflective layer 332. The pit layer 336 has pits formed thereon, e.g., using a stamper (not shown), representing a second data layer L1. The L1 data pits may be formed by either the 2P process (see FIG. 2) or the wet embossing process previously discussed. For example, layer 334 may be a standard type of resin, while the relatively thin layer 336 is selected for forming the pits in an optimal manner while minimizing shrinkage upon and/or after curing. Other thickness ranges or combinations for these two layers 334, 336 may also be used, e.g., with their total layer thickness being about 25 µm, while keeping layer 336 to be sufficiently thin to avoid excessive shrinkage associated with curing.

This is followed by a semi-reflective layer 338, e.g., silver alloy, a cover layer 340 and a hardcoat layer 342. The L0 and L1 data on the BD structure are read from the bottom side. In one example, the cover layer 340 and the hardcoat layer 342 are two separate layers of different types of resins, with respective thicknesses selected to provide desired or optimal properties, or to conform to certain established standards (e.g., total thickness of 75 µm). Furthermore, the hardcoat layer 342 has a higher modulus, i.e., less elastic, than the cover layer 340. In one example, a material having a modulus of greater than about 1200 MIN (mega pascal) at 25° C. is used for the hardcoat layer 342.

In other embodiments, one or both of the two-layer combinations, i.e., [334, 336] and [340, 342], may be a single layer of one material (instead of two layers of different materials), as long as the material properties and thickness are suitable for the specifications and/or performance requirements. Although UV-curable resins are preferred, other materials with appropriate properties (e.g., different shrinkage factor, modulus, curable by other means such as thermal or other forms of radiation) may also be used. It is preferable that the hardcoat layer 342 be made of a material with a high modulus to provide sufficient rigidity for effective protection.

Figure 4A:
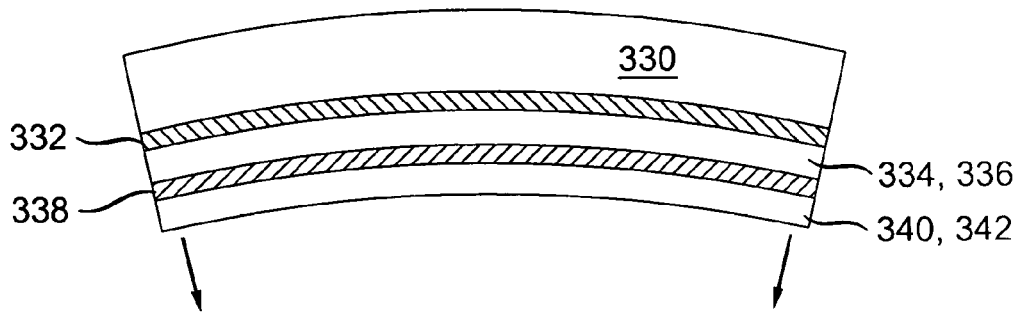
FIG. 4a is a schematic illustration of a tilt in a BD structure during fabrication.

Due to the reduced rigidity of the 0.5 mm polycarbonate disc substrate (compared to a standard 1.1 mm BD substrate), a problem may be encountered after one or more of the UV resin layers (e.g., layers 334, 336, 340 and 342, formed using one or more UV-curable acrylic resins known to one skilled in the art) in the 0.1 mm layer stack are formed in the BD substrate structure. Specifically, since the UV resin materials typically have a shrinkage factor of about 4-8% by volume during and/or after UV curing, the resulting BD structure may exhibit heavy "dishing" or curvature (also referred to as a "tilt" or warping) due to a force arising from the shrinkage associated with the curing of the resin material. This is illustrated in FIG. 4a, which shows the BD substrate 330 and the layers formed thereon having a concave shape when viewed from the bottom/readout side of the hybrid disc, or an umbrella shape when viewed in a side view.

From a manufacturing viewpoint, such significant dishing or curved contour may lead to one or more problems such as inability to perform one or more in-line or in-process tests, including, for example, disc inspection using an inline defect scanner, signal testing, or accurate thickness measurements on one or more of the resin layer(s) during disc fabrication.

In general, the material and thickness of respective curable layers formed over the data side (side 330a) of the BD substrate 330 (i.e., layers 334, 336, 340 and 342), are selected based on various factors such as optical, mechanical and/or chemical properties as determined by the functions and/or processing needs of the layers. For example, a protective or cover layer preferably has a relatively high modulus for effective protective function, while a layer in direct contact with a reflective layer that includes silver should be chemically compatible so as to avoid undesirable reaction. Any curvature resulting from shrinkage associated with the cured material may then be compensated for by using one or more curable layers formed on the other side 330b of the BD substrate 330 to offset the curvature or tilt (thus, the name "tilt-offset" layers) that may arise from material shrinkage. These tilt-offset material layers and corresponding processing steps used to alleviate or counteract the dishing effect are discussed below.

In one embodiment, a layer 324 is applied as a topcoat layer to the other side or surface 330b of the substrate 330 (i.e., opposite to the side 330a where layers 334, 336, 340 and 342 are located). In this case, layer 324 is used to produce a dish-up effect (by virtue of the bending force arising from its shrinkage upon curing) that at least partially compensates for the dish-down effect from the layers on the side 330a of the substrate. Since the amount of curvature change depends on the material properties (e.g., the shrinkage factor and the modulus) and the layer thickness, layer 324 can be selected to have a material and thickness combination that results in an amount of curing shrinkage that would at least partially offset the curvature arising from the shrinkage of one or more layers 334, 336, 340 and 342, such that the overall curvature of the substrate structure can be reduced. However, depending on the specific applications, this layer may not be needed in all situations. For example, it may be omitted if the dishing effect or curvature in the substrate structure resulting from resin layers 334, 336, 340 and 342 are within acceptable limits.

The material for this layer 324 (in process B8) may be a material such as a hardcoat layer material as used in process B7, e.g., with a modulus of at least 1200 MPa. In general, one or more of layers 334, 336, 340, 342 and 324 may be made of standard materials used in known processes, or they may be proprietary materials with properties suitable for the specific functions of the respective layers. In one example, about 50 µm of a UV-curable resin is applied to the surface 330b of substrate 330 using spin-coating on a BD line equipment. The material type, layer thickness and/or process conditions are selected to provide the final, cured layer 324 with a desired magnitude of shrinkage or dishing effect. One or more process conditions, e.g., temperature, spin-coating speed, and so on, are adjusted accordingly.

Figure 4B:
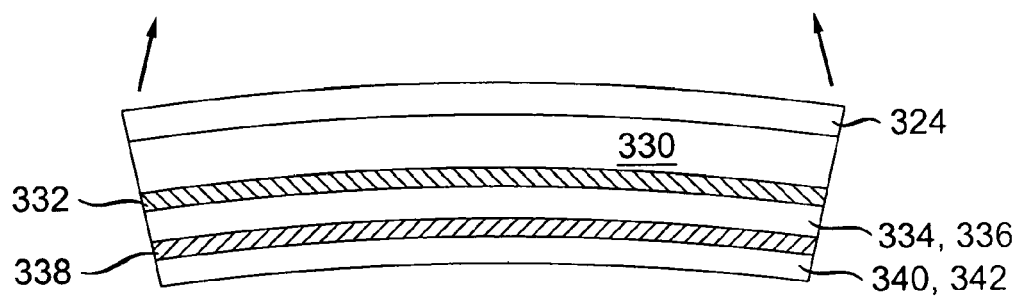
FIG. 4b is a schematic illustration of the BD structure having a tilt-offset layer.

FIG. 4b illustrates the shrinkage of the layer 324 providing a counter-balance, e.g., a force due to shrinkage that results in a dish-up effect, which at least partially offsets the dish-down effect from one or more of the resin layers 334, 336, 340 and 342, resulting in a substrate structure with reduced dishing or curvature compared to the structure of FIG. 4a. Appropriate choice of a combination of material, thickness and/or process condition can result in a BD substrate structure having improved flatness specification, e.g., sufficient to allow substrate inspection to be performed using standard equipment during fabrication.

In other embodiments, additional layers such as layers 322 and 326 may also be provided as a part of the BD substrate structure 300-1, e.g., layer 322 may be another tilt-offset layer for fine-tuning the tilt or curvature of the BD substrate structure. These layers will be discussed in a later section.

DVD Substrate Structure

As shown in FIG. 3, the DVD substrate structure 300-2 includes the following layers, starting from the top: a substrate 310, semi-reflective layer 312, spacer layer 314, reflective layer 316 and a protective layer 318. The substrate 310 has molded pits formed thereon, representing a first data layer L0, and the spacer layer 312 has molded pits formed thereon, representing a second data layer L1. Except for the semi-reflective layer 312 and the reflective layer 316, other layers of the DVD structure are transparent layers made from non-metallic materials, e.g., polycarbonate, acrylic resins, among others. In one example, layers 310, 312, 314 and 316 are formed in different machines (e.g., molding machine, sputtering machine and spin-coater) that are integrated in a DVD production system, and the protective layer 318 can be formed by spin-coating in a stripper-bonder that is separate from the DVD production system.

Although most of the materials and processes for forming this DVD structure are similar to those used for forming a standard DVD disc, e.g., DVD-9, various modifications to the process and/or materials can also be implemented to provide a final hybrid disc that conforms to other physical specifications, in addition to established or currently known standards. Again, examples of various layer thicknesses and ranges, as well as description of materials and application methods, are provided in Table 1.

In general, the transparent substrate 310 has a thickness less than about 0.65 mm. In one embodiment, the thickness is at least 0.55 mm, and in another embodiment, between about 0.56 mm and 0.64 mm.

In conventional fabrication process, the substrate 310 is provided or maintained within certain flatness specifications during manufacturing. However, according to one embodiment of the present principles, the molding process of DVD substrate 310 may be designed to provide a dishing effect or curvature that at least partially compensates for that of the BD substrate structure previously discussed, such that, when the DVD and BD structures are bonded, a hybrid disc with improved or optimum flatness (e.g., within desired specifications) can be produced. The DVD substrate molding may be achieved by adjusting one or more molding conditions (e.g., temperature, cooling time or rate, injection pressure, and so on) to produce a DVD substrate tilt to substantially compensate for the tilt of the BD substrate structure (i.e., including the topcoat layer 324). The resulting DVD substrate 310 will have an oppositely dished shape compared to that of the BD substrate structure (or a curvature that is opposite to the curvature of the BD structure, when both are viewed from the same side or direction). Such a substrate 310 with its associated layers 312, 314, 316 and 318 are illustrated in the top part of FIG. 4c. In some situations, it may also be desirable to maintain the molded DVD substrate below a tilt limit in order to provide sufficient process control for other subsequent processing steps, e.g., in forming a spacer layer.

Figure 4C:
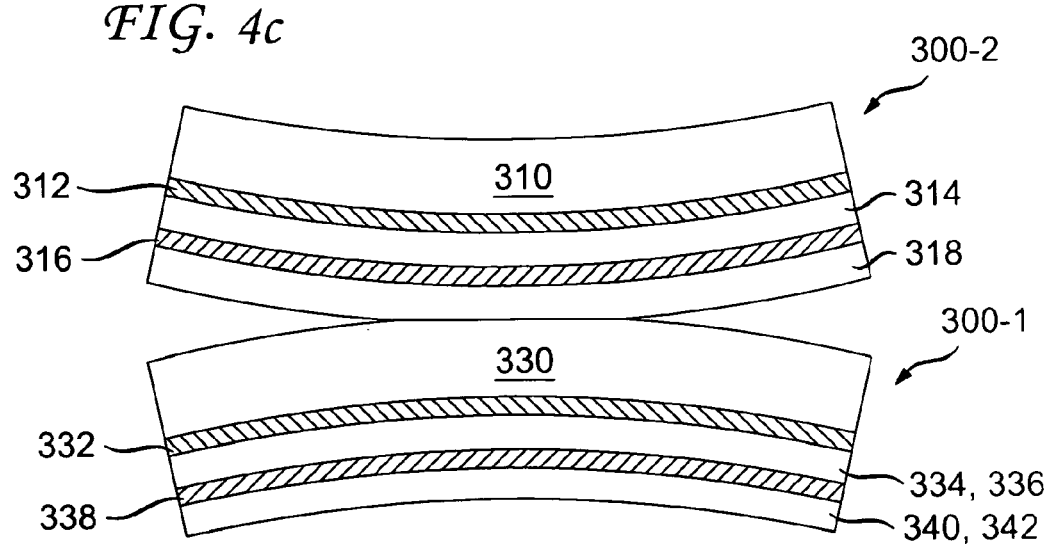
FIG. 4c is a schematic illustration of a DVD substrate having a tilt opposite to that of the BD structure.

In one example, the DVD substrate can be molded to provide a shape with equal curvature or contours as the concave shape of the BD substrate structure, except that the DVD substrate will be convex when viewed from the bottom side (or the BD readout side) of the final hybrid disc. Depending on the specific processing needs or disc applications, however, other embodiments can provide a molded DVD substrate having a curvature or contour that is not equal (but still having an oppositely dished shape) to that of the BD substrate structure. A subsequent bonding process, which can be performed in a stripper-bonder (to be described below), will bring the DVD substrate structure 300-2 and the BD substrate structure 300-1 together, with their centers contacting each other, as shown in FIG. 4c. In this example, the BD structure 300-1 is shown without the tilt-offset layers 322, 324 and the intermediate layer 326.

Bonding of DVD Substrate Structure to BD Substrate Structure

Referring back to FIG. 3 and Table 1, the DVD substrate structure 300-2 and the BD substrate structure 300-1 are bonded to each other by an adhesive layer 320 to form the hybrid disc. In one embodiment, the adhesive layer 320 is an adhesive such as that used in fabricating standard DVD-18, e.g., a UV-curable cationic adhesive, or a UV-curable pressure sensitive adhesive. The adhesive may be applied by screen printing, or another suitable technique, on a hybrid stripper-bonder, or similar units.

As previously mentioned, one or more additional layers, e.g., layers 322 and 326, can also be formed as part of the BD substrate structure 300-1 prior to bonding to the DVD structure 300-2. For example, layer 322 may be another tilt-offset layer to provide fine-tuning to compensate for any residual tilt (i.e., any tilt that may remain from the varying layers on the BD substrate structure and/or the molding of the DVD substrate) so that the resulting hybrid disc (i.e., after bonding the DVD and BD substrate structures together), will have a predetermined flatness within certain specifications, e.g., to conform with established standards or other application needs. Fine tuning of the tilt-offset can be achieved by selecting a combination of the material properties (e.g., shrinkage factor, modulus) and thickness of the layer.

In the example of FIG. 3 and Table 1, a layer 322 made of an UV-curable resin material, is applied to the BD substrate structure in process H3 (e.g., either directly to the top side 330b of the BD substrate 330, or to the resin layer 324), prior to bonding to the DVD substrate structure in the stripper bonder. The resin layer 322, which may be applied by spin-coating in the stripper bonder, can be used to provide additional dishing offset that may be needed in order to obtain a hybrid disc with a final flatness that is within certain desired specifications or standards. The material used in layer 322 may be the same or different from that of layer 324. For example, a material having a modulus of at least 1200 MPa can be used.

Aside from UV curable acrylic resins, other transparent materials (i.e., transparent to wavelengths for writing or reading the corresponding data layers) with suitable properties may also be used. In one example, the radial tilt on the DVD side is within a limit of ±0.8 degree, and that on the BD side is ±0.7 degree.

In yet another example, prior to forming the layer 322 in the BD substrate structure, a metal or dielectric layer 326 is applied over the resin layer 324. As shown in Table 1, this process B9 can be done in a sputtering machine, in which a thin coating having a thickness between about 5 to 50 nm (0.005-0.050 μm) is formed on the layer 324. The optimum thickness also depends on the specific material. Different materials may be used for layer 326, including, for example, a metal such as aluminum or silicon, a dielectric, or silicon nitride. In one example, a layer of silicon nitride having a thickness in a range of 5-10 nm is used. One advantage of providing an intermediate layer 326 is that, in situations where the adhesion or coverage of layer 322 directly over layer 324 poses a problem, layer 326 can be used to improve the coverage uniformity, e.g., by managing surface tension compatibility, or providing better surface tension matching, between adjacent layers. In addition, the intermediate layer 326 also facilitates disc handling during processing.

After bonding the two substrate structures to form the hybrid disc, a label can be printed on the DVD side (e.g., a relatively narrow band around the inner diameter so as not to interfere with the readout or normal operation of the DVD) such that the BD side faces down and the hybrid disc is used for "label-up" player insertion.

Disc Structure

Thus, one embodiment provides a data disc that includes a first substrate structure bonded to a second substrate structure, with the first substrate structure having at least one data layer in a first format that is different from a second format of a data layer in the second substrate structure, and one or more specific features such as those discussed above being provided in the data disc.

In another embodiment, a hybrid disc is formed by bonding a first substrate structure to a second substrate structure, in which, before bonding, the first substrate structure has a first curvature (or tilt) that is opposite, and preferably, substantially equal, to a second curvature (or tilt) produced by the second substrate structure. The curvature or tilt may be produced by applying one or more UV-curable resin layers on one side of a substrate structure, or by molding a substrate.

Another embodiment of the present principles also provides a substrate structure in which at least a first curable material layer is formed on one side of a substrate associated with the substrate structure, at least a second curable material layer is formed on the other side of the substrate, and each curable material has a property that results in shrinkage of the material layer upon curing (i.e., shrinkage may occur during and/or after curing). Due to the layer shrinkage, the first curable material layer would produce a first curvature (or tilt) in the substrate structure, and the second curable material layer would produce a second curvature (or tilt) in the substrate structure that is opposite to the first curvature, such that the resulting substrate structure has a final curvature with a magnitude that is less than either the first or the second curvature.

One embodiment includes a first substrate structure having a substrate with a thickness less than about 0.65 mm, and the second substrate structure having a second substrate with a thickness less than about 0.55 mm. In other embodiments, the total height of the hybrid disc may have a range of about 1.2-1.4 mm (including stacking rings).

While the discussions thus far focus on various material layers in the substrate structures, another aspect of the present principles relates to the formation of a disc substrate having different stacking ring configurations. A stacking ring, which is an annular protruded portion around an inner perimeter or diameter of an optical disc, is designed to avoid possible damage to the read surface of a disc by providing a gap between adjacent discs that are stacked together. As will be shown below, an embodiment where a stacking ring is absent on the top surface of the disc can better facilitate label printing because of a fully flat surface, and may also be a good option for providing a reduced total disc height in situations where there is a strict constraint relating to the disc height. For the purpose of this discussion, the stacking ring configurations are illustrated below in connection with a hybrid disc formed by bonding a DVD substrate to a BD substrate. However, the alternative stacking ring configuration and the corresponding process can generally be used in other applications or disc formats (including single format discs), and can be used alone or in combination with one or more features or embodiments of the hybrid disc discussed herein.

As mentioned, a DVD substrate in one embodiment of the present principles may be formed as in standard or conventional DVD-9 discs. In the standard DVD molding process, the mold for forming the L0 substrate (i.e., the substrate associated with the first data layer L0) has a recess for forming the stacking ring on the non-data side of the DVD molded substrate. A standard BD molding process also provides a similar stacking ring on the BD substrate. Thus, a hybrid disc formed by bonding the two substrate structures with their respective stacking ring will have two stacking rings.

Figure 5:
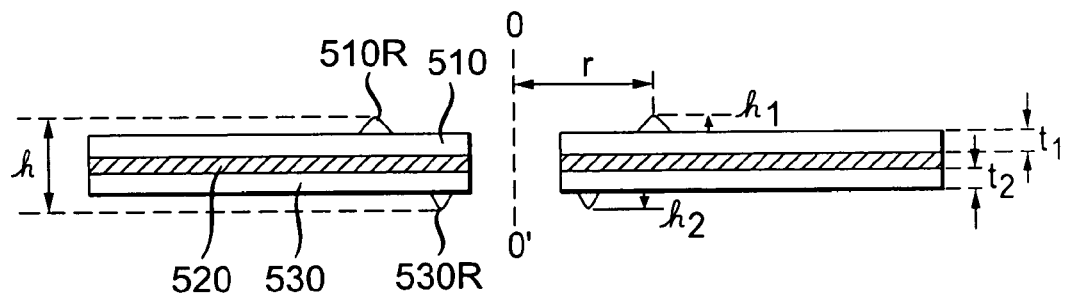
FIG. 5 is a cross-sectional illustration of a disc with two stacking rings.

This is illustrated in FIG. 5, which shows a hybrid disc of the present principles with two stacking rings 510R and 530R. In this example, the disc includes a first substrate structure 510 bonded to a second substrate structure 530 by a bonding or adhesive layer 520. The stacking ring 510R is formed on a first substrate of substrate structure 510, and stacking ring 530R is formed on a second substrate of substrate structure 530. For clarity, other layers and substrates in the respective substrate structures (similar to those supported by substrates 310 and 330 shown in FIG. 3) are omitted from FIG. 5.

The formation of the substrate structure such as structure 510 with its stacking ring and other material layers is further discussed with reference to FIG. 6a-d, which show cross-sectional views of various layers during different stages of forming a dual-layer disc, e.g., DVD. Only one half of the structure (e.g., corresponding to the left half of FIG. 5) is shown in FIG. 6a-d. Such a process sequence is also suitable for forming the DVD substrate 310 for use in one embodiment of the hybrid disc of the present principles.

Figure 6A:
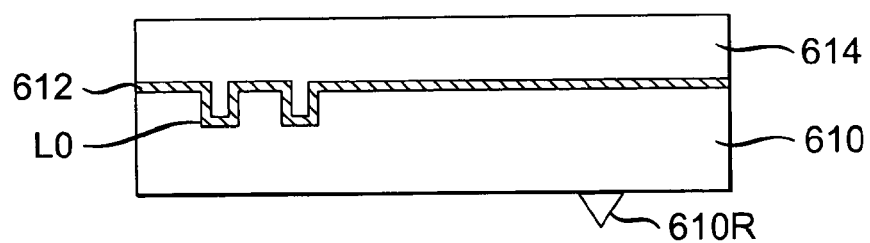
FIGS. 6a-d are cross-sectional views to illustrate a process sequence for forming a dual-layer substrate structure with a stacking ring.

FIG. 6a shows a DVD L0 substrate 610 formed by a L0 mold (i.e., the mold for forming the substrate associated with the first data layer L0) such that a stacking ring 610R is formed on the non-data side of the DVD L0 substrate 610. A stamper (not shown) is used to form pits (corresponding to L0 data) on the data side of the L0 substrate 610. After a semi-reflective layer 612, e.g., metal, is formed over the data surface of the L0 substrate 610, a spacer layer 614 is applied over the metal layer 612.

Figure 6B:
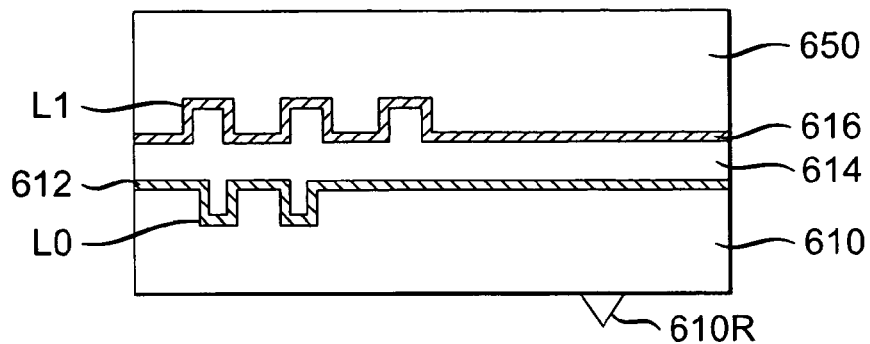

FIG. 6b shows a DVD L1 substrate 650, i.e., a substrate with a second data layer L1 pattern (formed in a molding machine with a L1 mold and a data stamper) having a metalized layer 616, e.g., aluminum, being used as a stamper to transfer the L1 data pattern to the spacer layer 614.

Figure 6C:
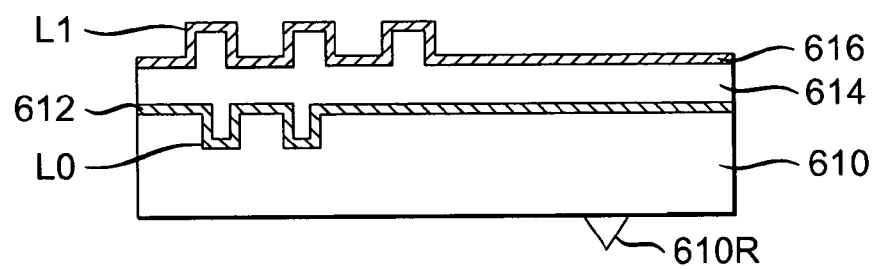
Figure 6D:
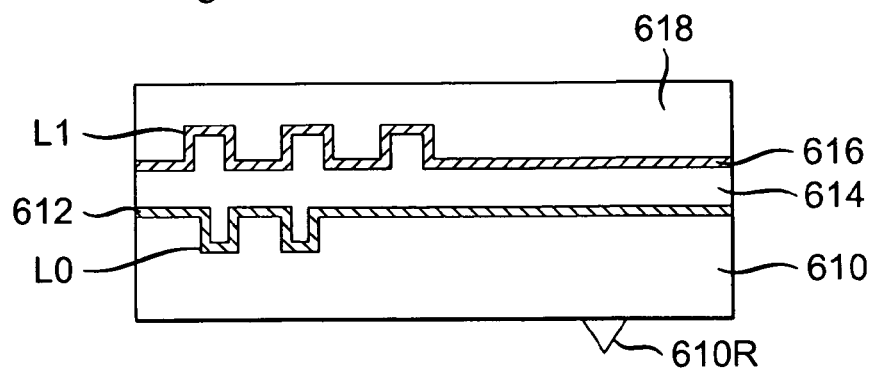

After this, the DVD L1 substrate 650 is removed (e.g., discarded, and does not form a part of the final DVD structure), leaving a substrate structure having two data layers L0 and L1, with the stacking ring 610R at the bottom of the L0 substrate 610, as shown in FIG. 6c. A protective layer 618 is then formed over the metalized L1 layer 616, after which, the DVD structure of FIG. 6d may be bonded to a BD structure to form a hybrid disc such as that shown in FIG. 5.

In FIG. 5, the stacking ring 510R (e.g., corresponding to ring 610R in FIG. 6) is formed on the non-data side of the DVD substrate, and the other stacking ring 530R is formed on the bottom side (or read side) of the BD substrate. These rings are formed at different locations around the inner perimeter of the hybrid disc, e.g., outside of the data area. In one embodiment, stacking ring 510R is located at a radial distance (r) of about 17.65 mm and ring 530R is located at a radial distance of about 9.735 mm (the radial distance being measured from the center vertical axis OO' of the disc).

In one example, each substrate structure has a thickness ($t_1$, $t_2$) of about 0.6 mm, stacking ring 510R has a height ($h_1$) of about 0.22 mm, and stacking ring 530R has a height ($h_2$) of about 0.12 mm (the height being measured from the plane of the corresponding substrate). After bonding, the resulting hybrid disc has a total height (h), including other layers, of about 1.62 mm, which is outside of the maximum disc height/thickness specified by the BD and DVD disc standards (e.g., System Description Blu-ray Disc Read-Only Format by BDA, and the DVD specifications for ROM by the DVD Forum).

Figure 7:
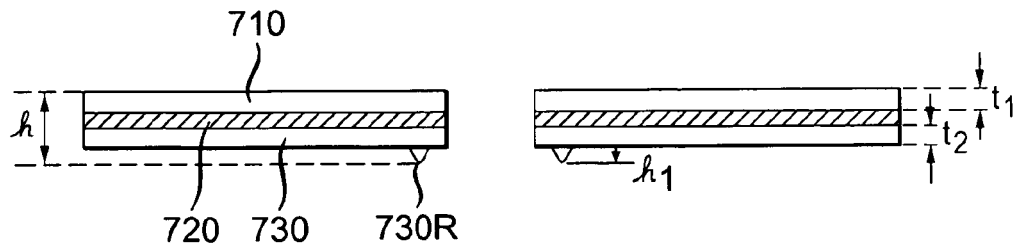
FIG. 7 is a cross-sectional illustration of a disc with one stacking ring.

Another embodiment of the present principles provides a different molding process for forming one of the disc substrate structures, e.g., the DVD substrate, using existing commercially available equipment (or those in standard manufacturing lines) such that the DVD substrate is formed without a stacking ring. The resulting hybrid disc of this embodiment will only have one stacking ring on the BD substrate (in this case, the thinner substrate in the disc), as shown in FIG. 7, which shows a first substrate structure 710 being bonded to a second substrate structure via a bonding layer 720. For clarity, the individual layers in the respective substrate structures 710 and 730 are omitted. In this example, the first substrate structure 710 is a DVD structure with a thickness ($t_1$) of 0.6 mm, and the second substrate structure is a BD substrate structure with a thickness ($t_2$) of 0.6 mm and a BD stacking ring with a height ($h_1$) of 0.12 mm. This results in a hybrid disc with a final height (h) of about 1.40 mm, which is within the existing DVD and BD disc standards.

For example, such a hybrid disc with only a single stacking ring can be produced by using existing DVD production equipment, by interchanging the L0 and L1 molds used for molding the DVD L0 and L1 substrates for standard DVD production. That is, according to a method of the present principles, in forming the DVD substrate structure of the hybrid disc, a mold typically used for forming the L0 DVD substrate (referred to as the "L0" mold, with a recess for forming the stacking ring) is used for molding the L1 DVD substrate, and a mold typically used for the DVD L1 substrate (referred to as the "L1" mold, without any recess for forming a stacking ring) is used for molding the DVD L0 substrate.

The stamping of the L0 data and L1 data are still using the respective L0 and L1 stampers, as in the process of FIGS. 6a-d. However, by exchanging the L0 and L1 molds in the respective molding machines (i.e., in systems where separate machines are used for molding the L0 and L1 substrates), the stacking ring can be formed on the L1 substrate, instead of on the L0 substrate. This can be better understood by referring to the cross-sectional views of FIG. 8a-c (unlike FIG. 7, only half of the disc cross-section is shown).

Figure 8A:
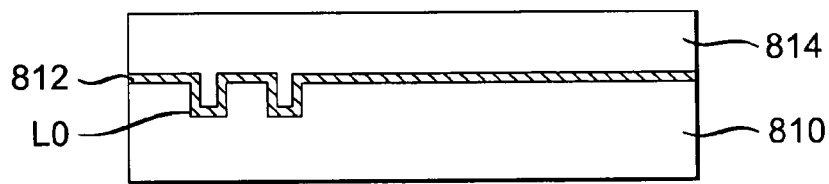
FIGS. 8a-d are cross-sectional views to illustrate a process sequence for forming a dual-layer substrate structure without a stacking ring.

FIG. 8a shows a DVD L0 substrate 810 with data formed on its data side (e.g., by injection molding and stamping), but without a stacking ring. This is followed by a semi-reflective layer 812 (e.g., metal, or silicon, . . . , etc.) and a spacer layer 814.

Figures 1, 8B:
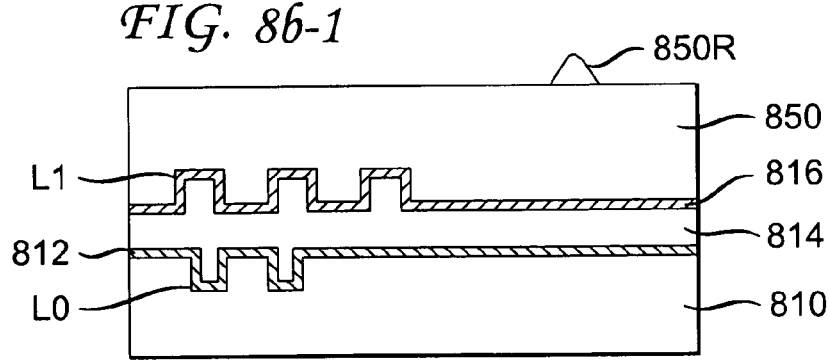

FIG. 8b-1 shows a DVD L1 substrate 850 molded with a stacking ring 850R (from the L0 mold) and a metal layer 816, e.g., aluminum, being used as a stamper to transfer the L1 data to the DVD spacer layer 814 (the DVD L1 substrate is stamped with the L1 data pattern prior to its being metalized). The L1 substrate 850 is then removed, e.g., in a stripper-bonder.

In one embodiment, the L1 substrate 850 is made of PMMA (polymethyl methacrylate), instead of polycarbonate. The use of PMMA facilitates the stripping and removal of the L1 substrate 850 from the metal layer 816 (because aluminum has poor adhesion to PMMA), thus leaving the transferred L1 data pattern and reflective layer 816 intact, as shown in FIG. 8c.

Figures 2, 8B:
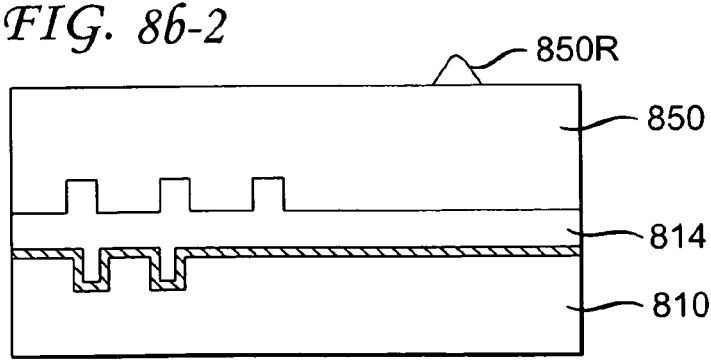

In another embodiment, polycarbonate (PC) is used for the L1 substrate 850 along with a spacer layer resin 814 that has poor adhesion to PC. This is shown in FIG. 8b-2, in which the un-metalized L1 substrate 850 is used as a stamper to transfer the L1 data pattern to the spacer layer 814. After stripping the polycarbonate L1 substrate 850 from the spacer layer 814, a reflective layer 816 (e.g., metal) is formed over the spacer layer 814, resulting in the structure of FIG. 8c.

Figure 8C:
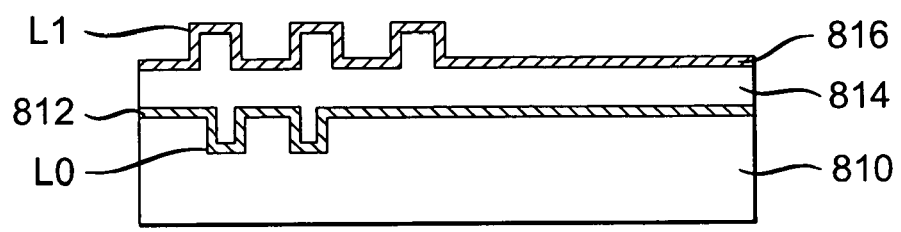
Figure 8D:
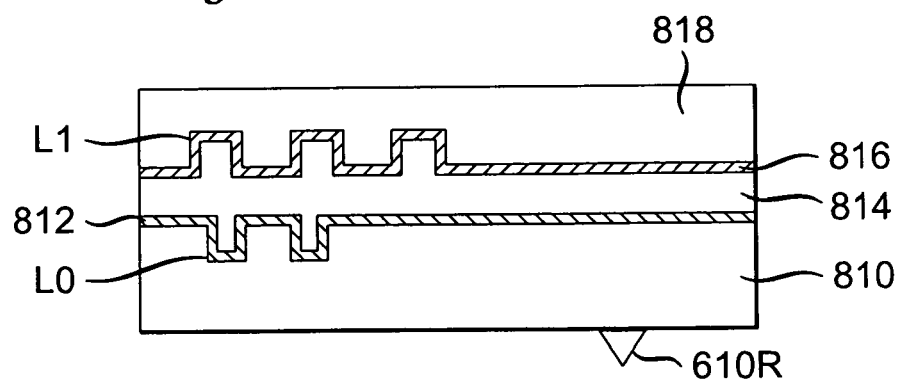

A protective layer is then formed over the reflective layer, as shown in FIG. 8c. This DVD substrate structure, which does not have any stacking ring, can then be bonded to a BD substrate structure to form a hybrid disc, such as that shown in FIG. 7. This configuration of a hybrid disc without a stacking ring on the top substrate (DVD in this case) also facilitates the printing of a label for the hybrid disc, e.g., a 2-3 mm radius band around the inner diameter of the disc.

Thus, by exchanging the L0 and L1 molds in the molding machines for the DVD substrates, existing manufacturing equipment for standard DVD production can be used to produce DVD substrate structures suitable for forming the hybrid discs of the present principles, with final disc heights (including stacking ring) being within the specified DVD and BD standards.

Hybrid Disc Fabrication Process

Another aspect of the present principles provides a method of forming a disc having at least two data formats, which includes forming a first substrate structure with at least a first data layer in a first data format, forming a second substrate structure with at least a second data layer in a second data format different from the first format, and bonding the first substrate structure to the second substrate structure. The first data layer or additional layers associated with the first substrate structure are read or accessed from a first side of the hybrid disc, and the second data layer or additional layers associated with the second substrate are read or accessed from the second side of the hybrid disc.

One example of the hybrid disc is a double-sided double-layer disc with DVD format and BD format, respectively, e.g., with one disc substrate structure corresponding to a DVD-9, and the other disc substrate structure corresponding to a BD-50. Other embodiments of the method further include one or more steps for forming the materials layers such as those discussed above in connection with FIG. 3 and Table 1 in the substrate structures. In one embodiment, the method involves forming at least two layers of curable materials, one on each side of a second substrate in the second substrate structure. Each curable material (the two curable materials may be the same or different) has a property that results in a certain amount of shrinkage after curing, which, in turn, may result in a tilt or curvature in the substrate structure. The amount of shrinkage generally depends on the specific material property and the layer thickness. By providing one or more curable material layers on opposite sides of the second substrate, the curvature of the second substrate structure can be controlled, e.g., by a combination of the material and thickness. Thus, by selecting the material property and/or thickness of the second curable material layer, the overall curvature of the substrate structure can be reduced, to conform with desired specification or standard, or sufficiently flat to allow in-line testing to be performed.

In another embodiment, the double-sided hybrid disc has only one stacking ring or an annular protruded portion, which is formed by injection molding on a thinner one of the two substrates. In the case of the hybrid disc having a first substrate structure being a DVD structure and a second substrate structure being a BD structure, the disc can be manufactured to conform to the DVD and BD standards by using conventional DVD and BD equipment. Specifically, by interchanging the two molds in a conventional DVD manufacturing tool, i.e., using the mold for a L0 substrate in forming the L1 substrate and vice versa, the DVD substrate structure can be formed without a stacking ring, as previously discussed in connection with FIG. 8. When such a DVD substrate structure is bonded to a BD substrate structure to form a hybrid disc, only a single stacking ring is present on the BD substrate structure, which allows the resulting hybrid disc to have a total thickness that complies with the DVD and BD formats. By interchanging the L0 and L1 molds in forming the DVD substrate structure, conventional DVD manufacturing equipment can readily be integrated into a system for making hybrid discs, e.g., DVD-BD hybrid discs.

System for Forming the Disc

Thus, another aspect of the present principles provides a system suitable for use in forming a hybrid disc of the present principles. Specifically, the system includes a first sub-system configured for use in forming a first disc substrate structure having a first disc format, a second sub-system configured for use in forming a second disc substrate structure having a second disc format that is different from the first disc format, and a third sub-system configured for bonding the first disc substrate structure to the second disc substrate structure. In one embodiment, the first disc format is a DVD format, and the second disc format is a BD format, and the data disc is formed with only one stacking ring in the second substrate structure, i.e., no stacking ring or annular protruded portion in the first substrate structure. The first and second sub-system each includes at least a molding machine, a spin-coater, a sputtering chamber, and an imprinting unit (e.g. a stamper or wet embossing unit) for performing one or more processes described above in connection with fabricating the hybrid disc. The third sub-system includes one or more units for applying resin or adhesive onto a substrate structure (e.g., a spin coater), curing materials, bonding substrate structures, and stripping or removing a stamper after an imprinting step. For example, the third sub-system can be a stripper-bonder, which includes a spin coater for applying a resin material to a substrate structure, and a ultra-violet radiation source for curing the resin.

Furthermore, the system has at least one processor and associated computer readable medium (e.g., hard drive, removable storage, read-only memory, random accessible memory, and so on). Program instructions are stored in the computer readable medium such that, when executed by the processor, will cause a method to be implemented according to one or more embodiments for forming a data disc of the present principles.

Although the above examples focused on a hybrid double-sided double-layer disc having DVD and BD formats, one or more features of the present principles may be adapted or implemented, separately or in various combinations with each other, to form other data discs with different format combinations and different number of data layers, including more than two data layers associated with each substrate structure. For example, aside from pre-recorded data layers, one or more of the data layers can be a recordable data layer, which can be formed by using a suitable recordable material, such as inorganic or organic materials known to one skilled in the art, including phase change materials or dyes. Thus, the disk of the present principles also includes pre-recorded formats such as DVD-ROM and BD-ROM, as well as different recordable formats such as write-once and rewritable formats. In addition, one or more of the two substrate structures can also have at least two data layers with different formats (i.e., not all the data layers associated with one substrate structure need to be the same format).

Furthermore, although it is desirable to provide hybrid discs or disc substrate structures conforming to one or more established or known standards, the present principles may also be used to form other discs with specifications that are different from known standards.

Grooves on Curable Material Layer(s)

During production or manufacturing of the above hybrid disc structure, a problem is encountered when substrate structures (e.g., disc halves) are stacked together during substrate handling or transport. Specifically, after a resin layer is formed and cured on a substrate structure, the smooth resin surface can adhere so tightly to a smooth surface (e.g., a resin layer, a substrate, among others) of another substrate structure that the two substrate structures become very difficult to separate.

To overcome this problem, one or more grooves are formed in the resin layer of the substrate structure. The presence of the grooves reduces the "adhesiveness" between the resin layer and the smooth surface of another substrate structure, thus preventing adjacent substrate structures from sticking to each other.

In one embodiment, the grooves are formed in a resin layer of the substrate structure 300-1 (e.g., FIG. 3 and TABLE 1). For example, after a resin material for the layer 324 has been dispensed, e.g., by spin-coating, and before curing the material, one or more air jets are directed towards the surface of the resin material while spinning the substrate structure 300-1. As the grooves are formed on the uncured resin surface by the air jets, the resin is also exposed to UV radiation for a time duration sufficient for the curing of the resin. In general, the resin can also be a material that is curable by other radiation such as thermal energy, and other gases (aside from air) can be used to form the jets, e.g., other inert or non-reactive gases.

Figure 9A:
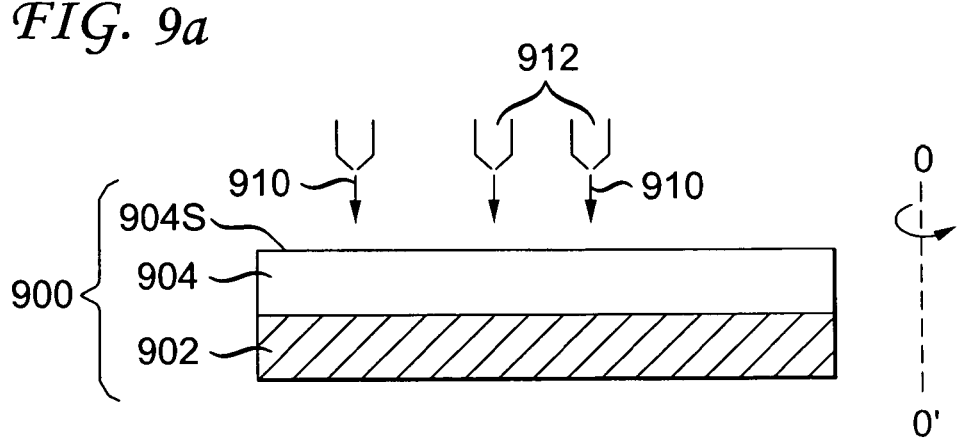
FIGS. 9a-b are cross-sectional views illustrating formation of grooves in a material layer according to another embodiment of the present principles.
Figure 9B:
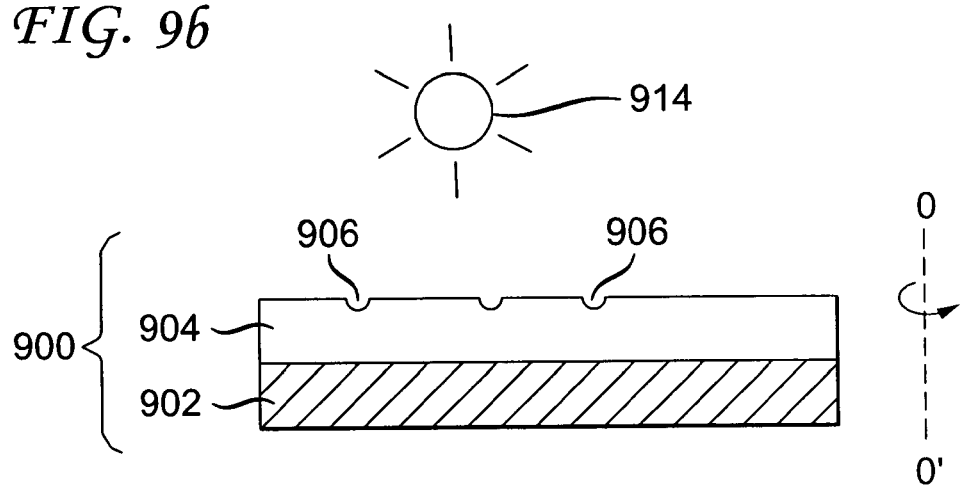
Figure 9C:
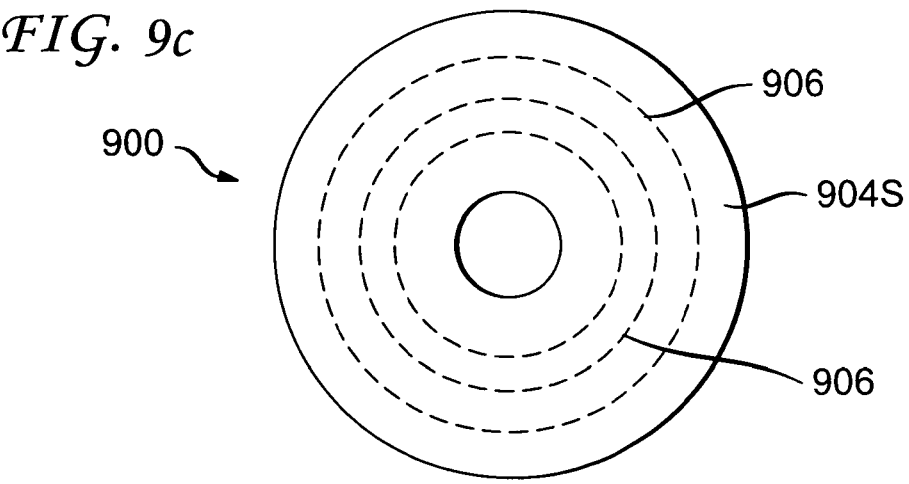
FIG. 9c is a top view of a disc with one or more grooves in the material layer of FIGS. 9a-b.

FIGS. 9a-b illustrate a process of forming these grooves. FIG. 9a shows a cross-sectional view of a substrate structure 900 (only one half of the structure is shown), having an uncured resin material 904 on a substrate 902. One or more gas jets 910 are directed at the resin surface 904S while the substrate structure 900 is maintained at a certain spin speed about its central vertical axis OO' (with an arrow indicating the substrate rotation). It is understood that the direction of substrate rotation, in this and subsequent examples, can also be reversed. The gas jets 910 can be provided by using a pressurized gas, e.g., air, through one or more nozzles 912 positioned at a certain distance above the resin surface 904S. FIG. 9b shows one or more concentric grooves 906 formed at the resin surface 904S, with the resin being exposed to radiation, e.g., from a UV source 914, for curing. In one example, the substrate structure 900 is transferred to a curing unit for UV curing after the grooves have been formed on the resin by the gas jets. FIG. 9c shows a plan or top view of the concentric grooves 906 formed on the resin surface 904S of substrate structure 900. Note that the grooves 906, shown here as dashed lines, can be continuous circular grooves and/or a number of separate groove segments, the latter of which will be discussed in an example shown in FIG. 10b.

The nozzles, gas jets and spin speed of the substrate can be adjusted to form grooves having a range of different widths and depths. Different number of grooves having various dimensions can be used, and can be formed by adjusting one or more parameters, such as the nozzle size (aperture diameter), gas jet flow rate (can be adjusted by varying the gas pressure upstream of the nozzle), distance of nozzles from the resin surface, angle of gas jets with respect to the disc surface, spin speed of disc, or a combination, among others. In one example, the nozzles (e.g., 20 nozzles), each with a diameter of about 0.7 mm, are arranged in a "comb" configuration, i.e., parallel to each other across the disc along its radial direction (from the inner perimeter near the disc's hub to the outer perimeter).

Air jets are formed by providing pressurized air (or other suitable gases) upstream (or at the back) of the nozzles, e.g., at a pressure in a range of about 1.2-2.5 bar. By varying at least the air pressure, the depth of the grooves can be adjusted, e.g., a higher pressure would result in a deeper groove. In one example, the pressure is about 1.8 bar. The distance between the nozzle and the disc surface (or the height above the disc) can range from about 1 mm to about 5 mm. This distance and the gas pressure of the jets can be selected in conjunction with each other to produce certain desired results, e.g., different groove dimensions and so on. Furthermore, the nozzles or gas jets can be provided at different angles with respect to the disc surface, e.g., 45-90°. In one example, the gas jets are arranged at an angle of about 60° with respect to the disc surface (which is typically kept horizontal).

Figure 10A:
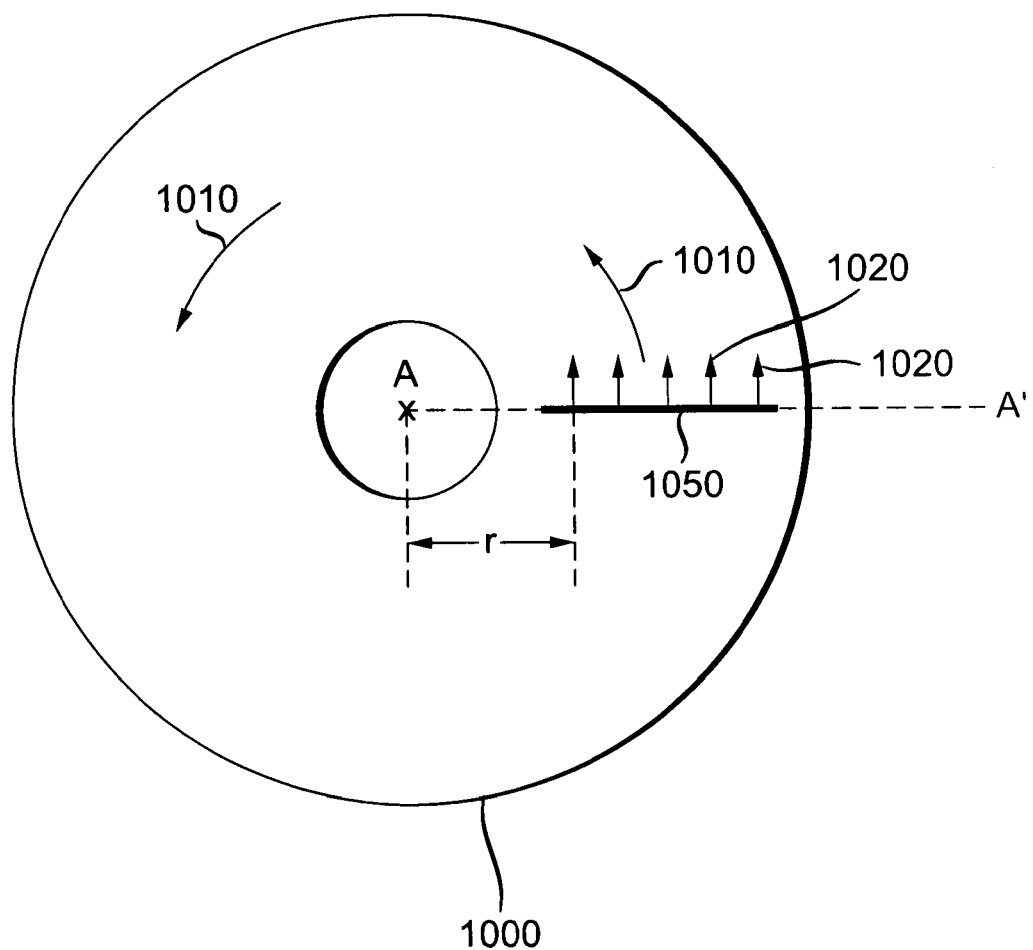
FIGS. 10a-b illustrate gas jets for forming grooves on a substrate structure.
Figure 10B:
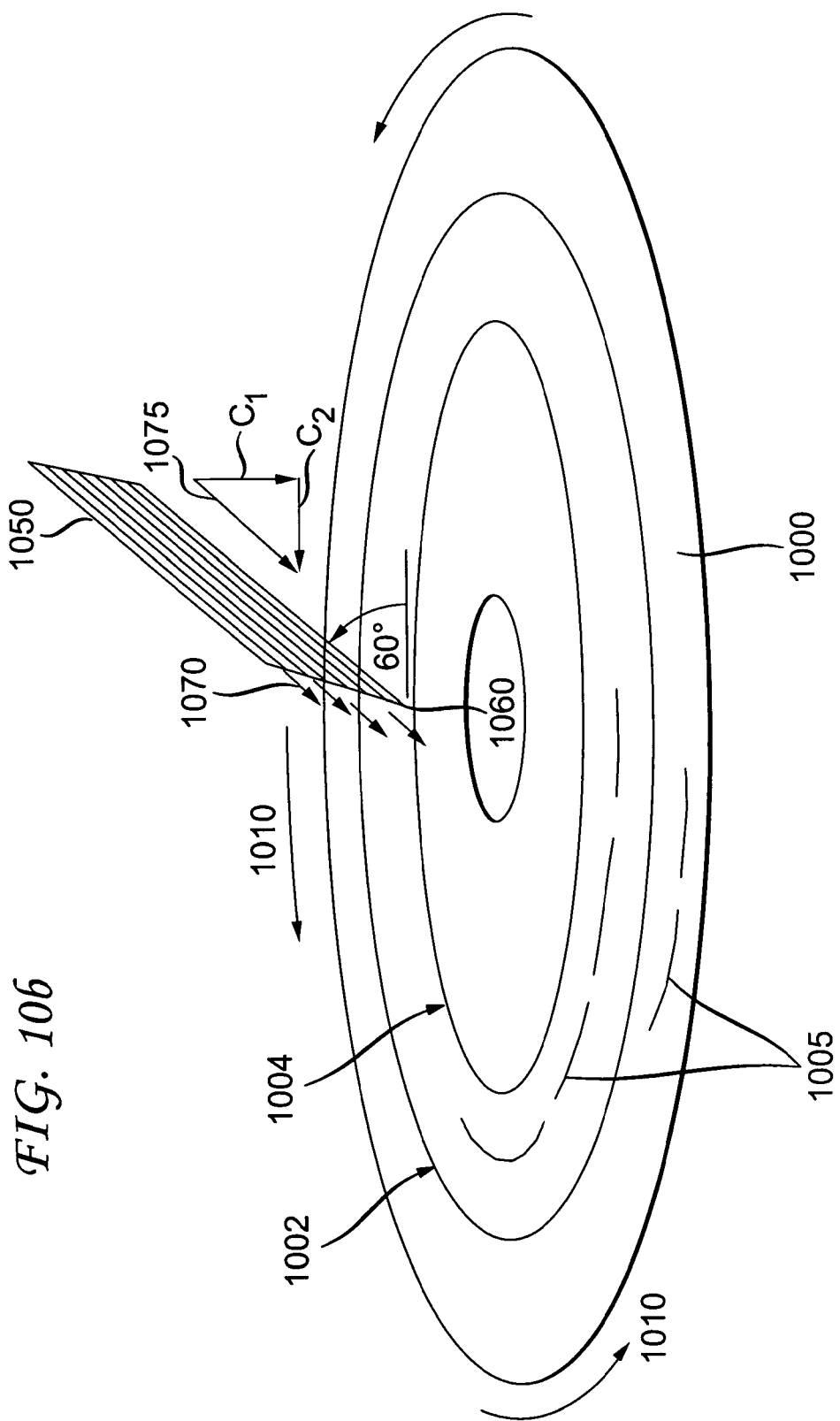

FIG. 10a and FIG. 10b show different views of a rotating disc 1000 with a blower 1050 for providing gas jets to form the grooves. FIG. 10a is a top view of the disc 1000 rotating about a vertical center axis passing through its center point A, with the rotation direction indicated by arrow 1010. In one embodiment, nozzles 1060 (see FIG. 10b) are arranged in a "comb" configuration and provided at one end of a housing, e.g., as an integrated unit. In another embodiment, the nozzles can also be provided as individual components, i.e., without bundling them as a single unit. The blower 1050 can be positioned in different orientations by tilting about a horizontal axis AA' parallel to the disc surface, such that the gas jets are blowing at an angle towards the disc surface, with forward components (e.g., horizontal components, in the plane of the disc) along the rotation direction of the local disc region, as shown by the arrows 1020. As the disc rotates underneath the nozzles (which remain stationary), grooves are formed on the surface of a curable material at respective radial distances (r), as measured from the center of the disc.

FIG. 10b is a perspective view showing the gas jets 1070 from nozzles 1060 being directed at an angle, e.g., about 60°, to the disc surface. In this case, the gas jets 1070 are provided in a direction 1075 with a downward component $C_1$ that is substantially perpendicular) (90°) to the disc surface, and a forward (horizontal) component $C_2$ that is along the local disc rotation direction. Again, the direction of disc rotation can be reversed, in which case, the forward component $C_2$ of the gas jets will be opposite to the local disc rotation direction.

The spin speed of the disc or substrate 1000 can range from about 120 to about 480 rpms (rotations per minute), with about 340 rpm being used in one example. If the nozzles 1060 are arranged along a radius of the disc 1000 (i.e., not spanning across the entire diameter on opposite sides of the hub or center hole of the disc), then at least one complete turn of the disc would be required to form a "complete" groove, i.e., in the form of a circle such as grooves 1002 and 1004. If desired, it is also possible to form one or more grooves or groove segments 1005, instead of a continuous closed groove such as a circular groove. These groove segments 1005 may be formed as shorter grooves at different locations on the curable layer surface, as long as these groove segments or patterns are sufficient to disrupt the adhesiveness and allow effective separation of adjacent discs that are stacked together. Such groove segments can be formed by different techniques, e.g., by providing gas pulses with given on/off time durations, instead of maintaining a continuous gas flow from the nozzles.

By varying one or more process parameters or hardware configurations, grooves spanning a radial distance (r) from about 15-60 mm can be formed, and in one example, at radial distance from about 20 mm to about 55 mm on the disc structure. These grooves can have a width from about 0.8mm to about 1.2 mm, and a depth of at least 4 μm. In one example, the depth is between about 4 μm to about 6 μm.

The above process conditions and groove dimensions are illustrative of some embodiments, and other operating conditions, groove dimensions, spacings and/or configurations can also used, as long as the resulting groove structure provides sufficient disruption of the flat surface area to allow separation of adjacent discs under conditions typically encountered in manufacturing or production operations. Although it may be preferable to have all nozzles configured with the same parameters, it is also possible to provide different parameters for at least some nozzles (e.g., different diameters, gas jet angles, distances from disc surface, etc.), if desired for certain applications. Additional examples of gas jet configurations are illustrated below.

Figure 11A:
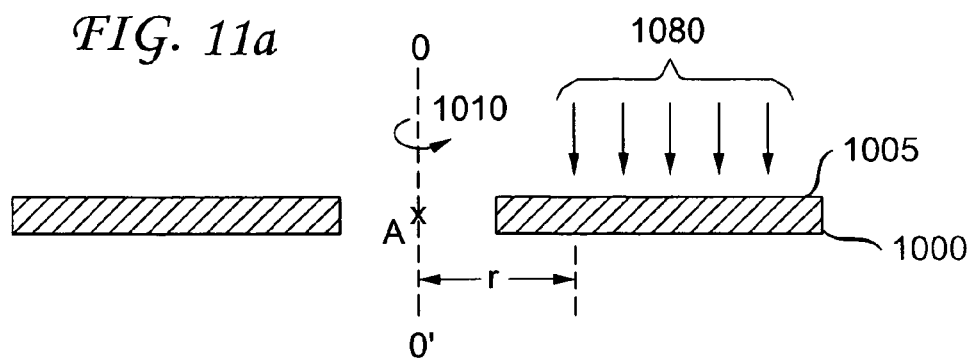
FIGS. 11a-b illustrate other examples of gas jets over a substrate structure.

FIG. 11a is a cross-sectional view across a diameter of disc or substrate 1000 showing gas jets above the rotating disc (arrow 1010 corresponding to the rotation direction) for forming grooves at various radial distances (r) from the center point A of the disc. In this view, the gas jet 1080 are directed at about 90° with respect to the disc surface 1005 (or parallel to the vertical axis OO' of rotation). Note that this view can also apply to the scenario of FIG. 10*b*, with the gas jet arrows 1080 representing the downward components $C_1$.

Figure 11B:
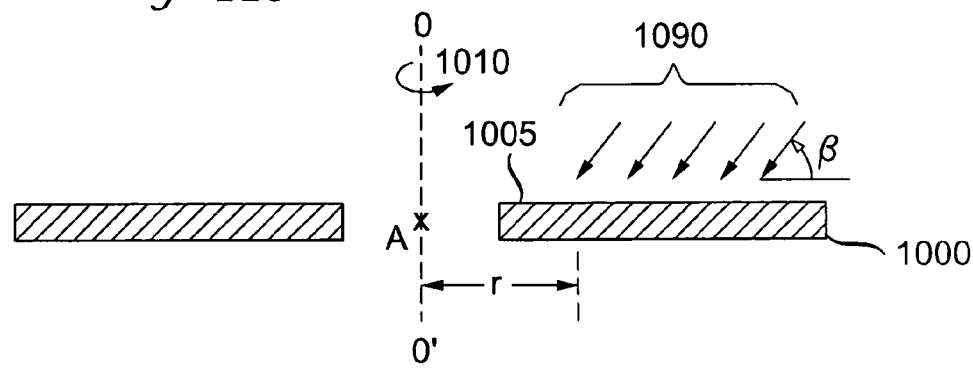

FIG. 11*b* shows another cross-sectional view in which the nozzles or gas jets are inclined at an angle (β) to the disc surface 1005, in a configuration different from that of FIG. 10*b* or FIG. 11*a*. In this case, the gas jets 1090 are directed downwards and towards the inside of the disc 1000, i.e., not parallel to the vertical axis OO'. Thus, the gas jet can have a horizontal component along a radial direction of the disc (as opposed to the case of FIG. 10*b*, where the horizontal component is along the disc rotation direction).

In desired, the gas jets can also be directed downwards and towards the outer perimeter of the disc. Another variation may include gas jet direction with a horizontal component that is opposite to the rotation direction of the local region of the disc.

Figure 12A:
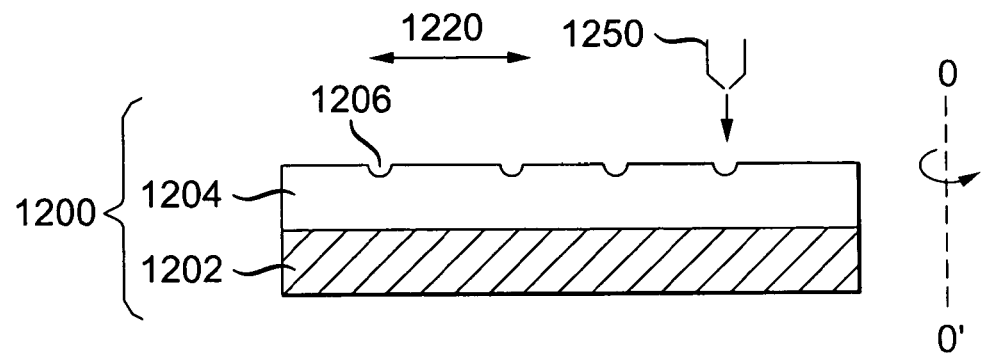
FIGS. 12a-b are respective cross-sectional and top views illustrating another embodiment of forming grooves on a substrate structure.
Figure 12B:
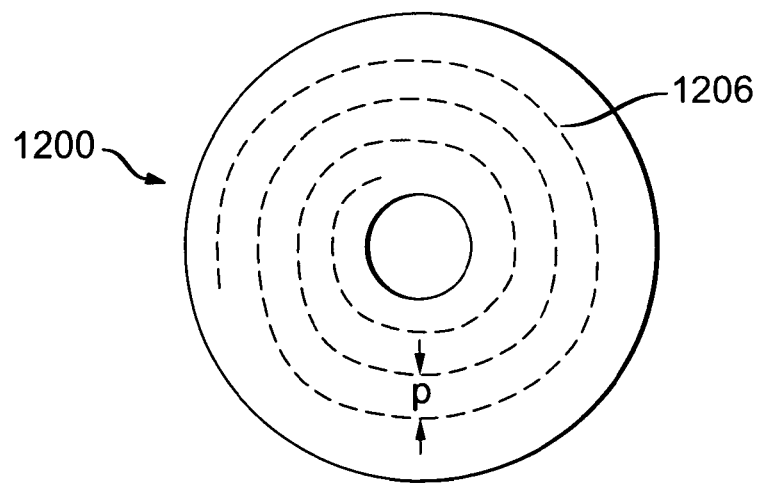

In yet another embodiment, instead of using more than one nozzle or multiple gas jets to form more than one groove, a single nozzle can be used to form one gas jet. This is illustrated in FIG. 12*a-b*, showing a nozzle 1250 positioned above a substrate 1200. The substrate structure 1200 includes a resin material 1204 formed over a substrate 1202. The nozzle 1250 can be configured to move in certain directions or patterns. For example, by moving the nozzle 1250 along a radial direction 1220 of a substrate structure 1200, as shown in FIG. 12*a*, a continuous spiral groove 1206 can be formed on the surface of the resin material 1204 that has been formed over a substrate 1202. FIG. 12*b* shows a top view of the spiral groove 1206. By adjusting the speed of travel of the nozzle 1250 in conjunction with the spin speed of the substrate structure 1200, the spiral groove 1206 can be formed at any given or predetermined pitch "p", corresponding to the separation between adjacent turns of the spiral groove 1206.

Other groove patterns, including regular or random spacing or designs, and different combinations thereof, can also be used.

Aside from providing a method of forming a substrate structure or half disc with at least one groove on a curable material layer, other embodiments also provide a substrate structure having at least one groove formed on at least one curable material layer, and an apparatus for forming the at least one groove on the curable material layer. For example, the blower with at least one nozzle for forming the grooves can be incorporated in a system or apparatus that includes a spin coater for applying the curable resin to the substrate structure and an energy source (e.g., UV light, thermal source) for curing the resin.

Furthermore, another embodiment provides a computer readable medium (e.g., memory, storage device, removable media, and so on) with stored program instructions, which, when executed by a processor, will cause a method to be implemented for forming a data disc with one or more grooves such as described above.

Although the example above illustrates formation of one or more grooves on the resin layer 324 of the BD substrate structure 300-1, the concept can also be applied to other curable material layers in the disc structure, e.g., one or more curable layers in the substrate structure 300-1, as appropriate, depending on the specific process or handling sequence used, which may also be different from those shown in Table 1. For example, if the process sequence were to be modified to apply layer 322 outside the stripper bonder (e.g., in the BD line), then one or more grooves may also need to be formed on the surface of resin layer 322 to facilitate handling or transport of the substrate structure prior to bonding with the DVD substrate structure 300-2. (In the process sequence shown in Table 1, in which the resin layer 322 is formed in the stripper bonder, grooves will not be needed for this layer because the BD disc substrates from the BD line would have already been separated from each other for loading into the stripper bonder.)

Furthermore, the formation of grooves on curable layers can be adapted or applied to other disc structures with layer configurations different from those in FIG. 3, including forming grooves on curable layers for both first and second substrate structures (e.g., in half-disc structures different from that of 300-2 in FIG. 3), or on more than one curable layers on the same substrate. In general, grooves can be formed on any curable material layer corresponding to an "uppermost" layer of a substrate structure during manufacturing to facilitate substrate handling or transport, as long as the grooves will not interfere with data access, i.e., the grooved layer will not be traversed by a data-read or data-write beam. One or more features of the present principles can be used alone, or in various combinations with each other, as appropriate, in forming a data disc of the present invention.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for forming a data disc having a first substrate structure and a second substrate structure, the first substrate structure having a data layer with a format different from a format of a data layer in the second substrate structure, the method comprising:
    forming a first curable material layer on a first side of the first substrate structure;
    forming a second curable material layer on a second side of the first substrate structure;
    forming at least one groove on the second curable material layer; and
    bonding the first substrate structure to the second substrate structure.

2. The method of claim 1, wherein the at least one groove is formed by:
    providing at least one gas jet over the second curable material layer;
    rotating the first substrate structure about a vertical central axis; and
    curing the second curable material layer.

3. The method of claim 1, wherein the at least one groove includes at least one of: a continuous spiral groove, a plurality of concentric circular grooves, and a plurality of groove segments.

4. The method of claim 3, wherein the continuous spiral groove is formed by:
    providing a gas jet over the second curable material layer;
    rotating the first substrate structure about a central vertical axis;
    translating the gas jet along a radial direction; and
    curing the second curable material layer.

5. The method of claim 3, wherein the plurality of concentric circular grooves is formed by:
    providing a plurality of gas jets over the second curable material layer;
    rotating the first substrate structure about a central vertical axis; and
    curing the second curable material layer.

6. The method of claim 4, further comprising:
rotating the first substrate structure at a speed in a range of about 120 to about 480 rotations per minute.

7. The method of claim 1, further comprising:
forming the at least one groove at a radial distance in a range of about 15 mm to about 60 mm from a center of the first substrate structure.

8. The method of claim 1, further comprising:
forming the at least one groove with a width in a range of about 0.8 mm to about 1.2 mm.

9. The method of claim 1, further comprising:
forming the at least one groove with a depth of at least 4 μm.

10. The method of claim 1, further comprising:
directing the at least one gas jet at an angle in a range of about 45 degrees to about 90 degrees with respect to a surface of the second curable material layer.

11. The method of claim 1, wherein the first and second curable materials each has a property that results in respective first and second amounts of shrinkage associated with curing of the materials, the method further comprising:
providing the first and second material layers at respective thicknesses such that a curvature of the first substrate structure associated with the first amount of shrinkage is substantially equal to a curvature of the first substrate structure associated the second amount of shrinkage.

12. The method of claim 1, further comprising:
forming a third curable material layer over the second curable material layer, and
forming a layer of material selected from one of a metal and dielectric between the second and third curable material layers.

13. The method of claim 12, further comprising forming at least one groove on the third curable material layer.

14. The method of any of the preceding claims, wherein the data layer of the first substrate structure has a Blu-ray disc (BD) format, and the data layer of the second substrate structure has a digital versatile disc (DVD) format.

15. A data disc comprising:
a first substrate structure bonded to a second substrate structure, the first substrate structure having a data layer with a format different from a format of a data layer in the second substrate structure,
the first substrate structure further comprising a first curable material layer and a second curable material layer on different sides of the first substrate structure;
wherein the second curable material layer has at least one groove formed thereon.

16. The disc of claim 15, wherein the at least one groove includes at least one of: a continuous spiral groove, a plurality of concentric circular grooves, and a plurality of groove segments.

17. The disc of claim 15, wherein the at least one groove is provided at a radial distance in a range of about 15 mm to about 60 mm from a center of the first substrate structure.

18. The disc of claim 15, wherein the at least one groove is provided at a radial distance in a range of about 20 mm to about 55 mm from a center of the first substrate structure.

19. The disc of claim 15, wherein the at least one groove has a width between about 0.8 mm to about 1.2 mm.

20. The disc of claim 15, wherein the at least one groove has a depth of at least 4 μm.

21. The disc of claim 15, further comprising at least a third curable material layer over the second curable material layer, and a layer of material selected from one of a metal and dielectric between the second and the third curable material layers.

22. The disc of claim 15, wherein the data layer of the first substrate structure has a Blu-ray disc (BD) format, and the data layer of the second substrate structure has a digital versatile disc (DVD) format.

* * * * *